US012807906B2

(12) United States Patent
Vousden

(10) Patent No.: US 12,807,906 B2
(45) Date of Patent: Nov. 24, 2026

(54) LAUNDRY ADDITIVE

(71) Applicant: BAYER HEALTHCARE LLC, Whippany, NJ (US)

(72) Inventor: Peter Vousden, New South Wales (AU)

(73) Assignee: BAYER HEALTHCARE LLC, Whippany, NJ (US)

( * ) Notice: Subject to any disclaimer, the term of this patent is extended or adjusted under 35 U.S.C. 154(b) by 279 days.

(21) Appl. No.: 18/685,817

(22) PCT Filed: Aug. 22, 2022

(86) PCT No.: PCT/AU2022/050936

§ 371 (c)(1),
(2) Date: Feb. 22, 2024

(87) PCT Pub. No.: WO2023/023710

PCT Pub. Date: Mar. 2, 2023

(65) Prior Publication Data

US 2025/0263641 A1 Aug. 21, 2025

(30) Foreign Application Priority Data

Aug. 24, 2021 (AU) ................................ 2021902671

(51) Int. Cl.

| | |
|---|---|
| ***C11D 3/22*** | (2006.01) |
| ***C11D 1/72*** | (2006.01) |
| ***C11D 3/04*** | (2006.01) |
| ***C11D 3/20*** | (2006.01) |
| ***C11D 3/30*** | (2006.01) |
| ***C11D 3/32*** | (2006.01) |
| ***C11D 3/48*** | (2006.01) |
| ***C11D 17/00*** | (2006.01) |

(52) U.S. Cl.

CPC ............ *C11D 17/0017* (2013.01); *C11D 1/72* (2013.01); *C11D 3/044* (2013.01); *C11D 3/2086* (2013.01); *C11D 3/2093* (2013.01); *C11D 3/221* (2013.01); *C11D 3/30* (2013.01); *C11D 3/323* (2013.01); *C11D 3/48* (2013.01); *C11D 17/0021* (2013.01); *C11D 2111/12* (2024.01)

(58) Field of Classification Search

CPC .. C11D 1/72; C11D 3/30; C11D 3/044; C11D 3/323; C11D 3/2093; C11D 17/0017; C11D 17/0021

USPC ......................... 510/276, 417, 499, 505, 506

See application file for complete search history.

(56) References Cited

U.S. PATENT DOCUMENTS

| | | | | |
|---|---|---|---|---|
| 4,666,940 | A | 5/1987 | Bischoff et al. | |
| 5,942,482 | A * | 8/1999 | Zocchi | C11D 3/2079 510/342 |
| 5,985,814 | A * | 11/1999 | Zocchi | C11D 3/0031 510/342 |
| 6,107,341 | A | 8/2000 | Hansen et al. | |
| 6,376,542 | B1 | 4/2002 | Hansen et al. | |
| 2014/0349913 | A1* | 11/2014 | Delaney | C11D 3/3796 510/488 |
| 2019/0270953 | A1* | 9/2019 | Piorkowski | C11D 3/43 |
| 2020/0277547 | A1* | 9/2020 | Pautsch | C11D 3/187 |

FOREIGN PATENT DOCUMENTS

| | | | | |
|---|---|---|---|---|
| CN | 109234055 | A | 1/2019 | |
| EP | 2774481 | A1 * | 9/2014 | A23L 33/127 |
| GB | 2340843 | A | 3/2000 | |
| WO | WO-2014047428 | A1 * | 3/2014 | C11D 3/2096 |
| WO | WO-2016081132 | A1 * | 5/2016 | C11D 1/66 |
| WO | 2020223959 | A1 | 11/2020 | |
| WO | WO-2020234196 | A1 * | 11/2020 | C11D 17/0017 |

OTHER PUBLICATIONS

Arpimed Benzyl benzoate, 25% emulsion for external use, Retrieved from internet: URL: https://arpimed.am/benzyl-benzoate-25-emulsion-for-external-use/.

Chang, J H et al., "Effect of application of benzyl benzoate on house dust mite allergen levels" Annals of Allergy, Asthma and Immunology, vol. 77, pp. 87-90. (Year: 1996).

FMC Biopolymer, Section 10, Emulsions 2007, By Drs. Pardeep K. Gupta, Clyde M. Ofner and Roger L. Schnaare. URL: https://paperzz.com/doc/9141624/emulsions---fmc-biopolymer.

International Search Report and Written Opinion from International Application No. PCT/AU2022/050936, dated Sep. 29, 2022.

Mrs. Meyer's Clean Day Laundry Detergent—Lemon Verbena website instructions and ingredients, Obtained from internet [URL: https://www.mrsmeyers.com/product/laundry/laundry-detergent/liquid-laundry-detergent- lemon-verbena/].

Tovey, E.R. et al., "Effectiveness of laundry washing agents and conditions in the removal of cat and dust mite allergen from bedding dust" Journal of Allergy and Clinical Immunology, vol. 108, issue 3, pp. 369-374 (Year: 2001).

* cited by examiner

*Primary Examiner* — Gregory R Delcotto

(57) ABSTRACT

The present invention relates to liquid chemical formulations that are useful as domestic laundry additives for deactivating and/or denaturing one or more allergens and/or killing dust mites on textiles. The present invention also relates to processes for preparing such formulations and methods for the use of the formulations to deactivate and/or denature one or more allergens and/or kill dust mites on textiles.

21 Claims, No Drawings

LAUNDRY ADDITIVE

CROSS-REFERENCE TO RELATED APPLICATIONS

The present application is a 35 U.S.C. § 371 national phase entry of International Application No. PCT/AU2022/050936, filed on Aug. 22, 2022, which claims priority to Australian Patent Application No. 2021902671, filed Aug. 24, 2021, both of which are hereby incorporated by reference in their entirety.

FIELD OF THE INVENTION

The present invention relates to liquid chemical formulations that are useful as domestic laundry additives for deactivating and/or denaturing one or more allergens and/or killing dust mites on textiles.

BACKGROUND

Allergy to dust mites and other environmental allergens are prevalent in the population, especially in humid climates. Allergic reactions experienced by sufferers can range from mild to severe, and include sneezing, wheezing, itchy and watery eyes, rhinitis, itching of the skin, the appearance of hives on the skin and other effects. Common allergens include dust mites, pollen, grasses, animal dander and the like.

In addition to the dust mite itself, their bodies, secretions and faeces contain proteins that are allergenic to susceptible people. The diet of a dust mite includes flakes of skin, pollen and fungal spores. Flakes of skin shed by humans combined with the warmth and humidity of an indoor environment means that regular households provide optimum conditions for dust mites and their allergens.

While exposure to outdoor allergens may be reduced by limiting time outdoors, indoor allergens are found on household textiles, such as clothing, linen, towels, bedding, plush animals and long-fibred carpets. Given the proximity of clothing and other textiles in everyday situations, the presence of allergens in textiles may exacerbate an allergic reaction. While some allergens may be removed by washing in cold water, allergens such as dust mites require washing at elevated temperatures, which may not be compatible with all textiles.

Acaricides, miticides and anti-allergen actives may be used in removing mites and allergens present in textiles, however delivery of these actives in an efficient and easy to use manner is difficult given the physical properties of the actives. While laundering of textiles may remove some allergens, the direct addition of actives that are intended to kill dust mites and/or denature or deactivate allergens is unlikely to be successful given the incompatibility of such actives with the aqueous nature that is characteristic of household laundry conditions.

There exists a need for compositions that are suitable for use in killing dust mites and/or denaturing or deactivating allergens in household textiles.

SUMMARY OF THE INVENTION

The present invention relates to stable, non-hazardous, non-flammable aqueous laundry formulations that are used as additives under domestic laundry conditions such that any mites and/or allergens present on the fabrics and textiles subject to washing and/or rinsing in the presence of the emulsion are killed and subsequently removed. The formulations described herein contain a miticide to kill dust mites, which are known to trigger allergic reactions in affected individuals.

The formulations described herein contain benzyl benzoate as an active component, which is a known miticide. Since benzyl benzoate has extremely low solubility in water the formulations are provided in the form of a homogeneous oil-in-water emulsion that is compatible with aqueous environments. The emulsions comprising benzyl benzoate as described herein comprise one or more emulsifiers to enable the formation and stabilisation of the emulsion. The emulsions are stable and provided to the end user as a concentrate and are "ready to use" by the consumer in a domestic setting.

According to a first aspect, the present invention provides an anti-dust mite laundry formulation in the form of an oil-in-water emulsion, wherein the emulsion comprises:

i) an oil phase comprising benzyl benzoate and one or more emulsifiers;
ii) a water phase comprising a preservative, an emulsion stabiliser and a pH modifying agent.

In an embodiment of the first aspect, the emulsion comprises benzyl benzoate present in an amount of between about 10% w/w and about 25% w/w.

In another embodiment of the first aspect, the emulsion comprises one or more emulsifiers selected from the group consisting of sorbitan esters, ethoxylated castor oils and ethoxylated fatty alcohols. In an embodiment, the emulsion comprises a sorbitan oleate. In another embodiment, the emulsion comprises an ethoxylated castor oil. In another embodiment, the emulsion comprises an ethoxylated fatty alcohol. In embodiment of the first aspect, the emulsion comprises the one or more emulsifiers present in an amount between about 1% w/w to about 5% w/w.

In addition to the dust mite itself, the bodies, secretions and faeces of dust mites contain proteins that are allergenic to susceptible people. Since these allergenic parts of a dust mite are found in locations in which the dust mites exist, i.e. household textiles, the formulations described herein may also contain one or more allergen denaturants that allow for denaturation and/or deactivation of these protein allergens. Optionally, the formulation may further comprise an agent(s) for the denaturation or deactivation of one or more additional allergens.

According to a second aspect, the present invention provides an anti-dust mite and anti-allergen laundry formulation in the form of an oil-in-water emulsion, wherein the emulsion comprises:

i) an oil phase comprising benzyl benzoate and one or more emulsifiers; and
ii) a water phase comprising one or more allergen denaturants, an emulsion stabiliser, a pH modifying agent and a preservative.

In an embodiment of the second aspect, the emulsion comprises one or more allergen denaturants present in an amount of between about 0.1% w/w to about 5% w/w.

In an embodiment of the second aspect, the allergen denaturant comprises urea.

In an embodiment of the second aspect, the emulsion urea in an amount of between about 0.1% w/w to about 5% w/w.

In an embodiment of the first and second aspects, the emulsion comprises benzyl benzoate present in an amount of between about 10% w/w and about 20% w/w.

In another embodiment of the first and second aspects, the emulsion comprises one or more emulsifiers selected from the group consisting of sorbitan esters, ethoxylated castor oils and ethoxylated fatty alcohols.

In another embodiment of the first and second aspects, the emulsion comprises one or more emulsifiers present in an amount of between about 1% w/w to about 5% w/w.

In an embodiment of the first and second aspects, the emulsion comprises an emulsion stabiliser present in an amount of about 0.1% w/w to about 1% w/w.

In an embodiment of the first and second aspects, the emulsion comprises a pH modifying agent that increases the pH of the emulsion.

In an embodiment of the first and second aspects, the emulsion comprises a pH modifying agent that increases the pH of the emulsion, wherein the pH modifying agent is present in an amount of between about 0.1% w/w to about 5% w/w.

In an embodiment of the first and second aspects, the emulsion comprises a pH modifying agent that decreases the pH of the emulsion.

In an embodiment of the first and second aspects, the emulsion comprises a pH modifying agent that decreases the pH of the emulsion, wherein the pH modifying agent is present in an amount of between about 0.1% w/w to about 0.5% w/w.

In an embodiment of the first and second aspects, the emulsion comprises a preservative present in an amount of between about 0.1% w/w to about 5% w/w.

The formulations disclosed herein having anti-dust mite properties contain benzyl benzoate, which is a known acaricide and miticide. Benzyl benzoate is a small organic compound and has extremely low solubility in water, which presents difficulties in both formulation and use in aqueous environments. The amounts of benzyl benzoate in the formulations must be sufficient to provide an acaricidal and/or miticidal effect, but also will depend on the dosage rate, i.e. the amount of the emulsion that is used by the consumer under standard conditions.

In embodiments of the present invention, formulations described herein in the form of an oil-in-water emulsion, provide benzyl benzoate in an amount sufficient to deactivate one or more mites. In some embodiments, the mite is a dust mite. In other embodiments, the mite is a scabies mite.

In some embodiments, the formulation comprises one or more allergen denaturants, which provide anti-allergen properties and results in an anti-allergen formulation. In an embodiment, the emulsion comprises urea as an allergen denaturant. In another embodiment, the emulsion comprises triethanolamine as an allergen denaturant. In a further embodiment, the emulsion comprises both urea and triethanolamine as an allergen denaturant. In an embodiment, the emulsion comprises one or more allergen denaturants in a total of between about 1% w/w and about 10% w/w. In some embodiments, the emulsion comprises two allergen denaturants, where the allergen denaturants are present in the same or different amounts. In an embodiment, the emulsion comprises two allergen denaturants present in the same amounts. Where benzyl benzoate is present in the formulation and one or more allergen denaturants are also present, the formulation is in the form of an oil-in-water emulsion and has both anti-dust mite and anti-allergen properties.

The formulations described herein in the form of an oil-in-water emulsion of the present invention comprise one or more emulsifiers. Without wishing to be bound by theory, the applicant believes that the use of an emulsifier can modify the hydrophilic-lipophilic balance (HLB) of the emulsion, such that the benzyl benzoate (and other components) remains soluble and part of the emulsion. In order to achieve the desired HLB to maintain the emulsion comprising benzyl benzoate, a judicious choice of both the class of emulsifier and the specific emulsifier is required, since not all emulsifiers are chemically compatible with other components or under particular conditions. Where the emulsion comprises more than one emulsifier, the HLB of the emulsion will be influenced by each of the emulsifiers. In this situation, the HLB of the emulsion will be affected by the classes and the exact nature of the emulsifiers, but also the ratio in which the emulsifiers are provided. Furthermore, other considerations that are relevant to the choice of the one or more emulsifiers includes the overall cost, the physical properties, the amounts to be used, and specific to emulsions having more than one emulsifier, the ratio in which the emulsifiers are present. Where more than one emulsifier is present, the effect of the emulsifiers together may contribute to the stability of the emulsion and shelf life of the product.

In an embodiment of the first and second aspects, the oil-in-water emulsion comprises one or more emulsifiers, wherein at least one emulsifier is a sorbitol-based surfactant. In a further embodiment, at least one emulsifier is an esterified sorbitol-based surfactant. In a further embodiment, at least one emulsifier is a polyethoxylated sorbitol-based surfactant. In another embodiment, at least one emulsifier is an esterified polyethoxylated sorbitol-based surfactant.

In further embodiments, the one or more emulsifiers are present in an amount sufficient to provide a stable oil-in-water emulsion, where the nature of the emulsion depends on the nature of the components. In an embodiment, the one or more emulsifiers are present in an amount of between about 1% w/w and about 10% w/w. In some embodiments, the one or more emulsifiers are present in an amount of about 1% w/w, 2% w/w, 3% w/w, 4% w/w, 5% w/w, 6% w/w, 7% w/w, 8% w/w, 9% w/w or about 10% w/w.

In some embodiments, the emulsions disclosed herein comprise more than one emulsifier. In some embodiments, the emulsions comprise two emulsifiers in a ratio of between about 1:1 to about 10:1, for example, about 1:1, 2:1, 3:1, 4:1, 5:1, 6:1, 7:1, 8:1, 9:1 or about 10:1. In some embodiments, the emulsifiers are provided as part of the oil phase of the oil-in-water emulsion.

The formulations disclosed herein may comprise one or more allergen denaturants, optionally chemical-based allergen denaturants, suitable to remove any allergens present (for example, parts of dust mites that contain protein allergens). Accordingly, provided herein are formulations in the form of emulsions, particularly oil-in-water emulsions, comprising allergen denaturants, which are suitable for use with textiles and are non-toxic and non-hazardous to consumers.

In an embodiment, the formulations comprise one allergen denaturant. In other embodiments, the formulations comprise more than one allergen denaturant. The formulations disclosed herein comprise one or more allergen denaturants in an amount between about 1% w/w to about 10% w/w.

The formulations described herein that are emulsions are oil-in-water emulsions, meaning that they comprise a water phase as the majority component and an oil phase as the minority component. The emulsions disclosed herein may comprise one or more solvents. Since the emulsions are intended as laundry additives, they must be compatible with and effective in an aqueous environment. Furthermore, the active agents that are delivered in the emulsion must show the requisite manufacturing and storage stability under standard conditions.

The use of one or more other non-emulsifier components may also contribute to the maintenance of the formulation as an emulsion (where appropriate), such as a suspending agent, a thickener, emulsion stabiliser or the like. In an embodiment, the formulation comprises an emulsion stabiliser. In an embodiment, the emulsion stabiliser is a xanthan gum. In an embodiment, the formulation comprises an emulsion stabiliser in an amount of between about 0.1% w/w and about 1% w/w. In another embodiment, the formulation is in the form of an oil-in-water emulsion and comprises an emulsion stabiliser in an amount of between about 0.1% w/w and about 1% w/w. In other embodiments, the emulsion stabiliser is present in an amount of about 0.1% w/w, about 0.2% w/w, about 0.3% w/w, about 0.4% w/w, about 0.5% w/w, about 0.6% w/w, about 0.7% w/w, about 0.8% w/w, about 0.9% w/w or about 1% w/w. It will be understood that the exact nature of the emulsion stabiliser that is used will depend on the other components in the emulsion, the nature of any emulsifiers present and the characteristics of the emulsion without the stabiliser. The emulsion stabiliser may also provide other features, such as thickening of the emulsion in addition to stabilising the emulsion.

In other embodiments, the formulations comprise one or more further additives. In an embodiment, the emulsion further comprises a pH modifying agent. In an embodiment, the pH modifying agent serves to increase the pH of the emulsion. In other embodiments, the pH modifying agent serves to decrease the pH of the emulsion. While sufficiently high or low pH environments may also denature proteins however emulsions and formulations having pH values that are capable of denaturing allergen proteins are likely to be incompatible with textiles, laundry machines and consumer use in general. As described herein it has been found that the addition of a pH modifying agent provides a non-neutral emulsion, which may contribute to the denaturing and deactivation of allergen proteins.

In some embodiments, the emulsion further comprises a pH modifying agent that increases the pH of the emulsion. In some embodiments, the pH modifying agent is triethanolamine. In some embodiments, the pH modifying agent in the emulsion is present in an amount of about 0.1% to about 5% w/w. Where the emulsion comprises a pH modifying agent that increases the pH of the emulsion, the pH of the resultant emulsion is typically greater than about 7. In some embodiments, the pH of the resultant emulsion is greater than about 8. In some embodiments, the pH of the resultant emulsion is greater than about 9. In some embodiments, the pH of the resultant emulsion is greater than about 10.

In other embodiments, the emulsion comprises a pH modifying agent that decreases the pH of the emulsion. Where the emulsion comprises a pH modifying agent that decreases the pH of the emulsion, the pH of the resultant emulsion is typically less than about 7. In some embodiments, the pH of the resultant emulsion is less than about 6. In some embodiments, the pH of the resultant emulsion is less than about 5. In some embodiments, the pH of the resultant emulsion is less than about 4.5. In some embodiments, the pH modifying agent is lactic acid.

In another embodiment, the emulsion further comprises one or more preservatives. The presence of a preservative in the emulsion serves to increase the shelf life and storage stability of the emulsion, meaning that the formulation that is provided to consumers is maintained in the form of an emulsion for longer and does not harbour any unwanted bacterial or fungal growth in the emulsion. The presence of a preservative in the emulsion serves to increase the shelf life and storage stability of the emulsion, meaning that the formulation that is provided to consumers is maintained in the form of an emulsion for longer and does not harbour any unwanted bacterial or fungal activity in the emulsion. In an embodiment, the emulsion comprises one preservative. In another embodiment, the emulsion comprises more than one preservative. In an embodiment, the preservative is phenoxyethanol. In another embodiment, the preservative is benzisothiazolinone. In another embodiment, the emulsion comprises both phenoxyethanol and benzisothiazolinone as preservatives. In an embodiment, the formulations disclosed herein comprise one or more preservatives in an amount of between about 0.1% w/w and about 2% w/w. In another embodiment, the formulations disclosed herein comprise phenoxyethanol in an amount between about 0.1% w/w and about 2% w/w. In another embodiment, the formulations disclosed herein comprise phenoxyethanol and benzisothiazolinone in an amount of between about 0.1% w/w and about 2% w/w.

According to a third aspect, the present invention provides a method for killing one or more dust mites in a textile, the method comprising contacting the textile with a formulation as defined in the first aspect.

According to a fourth aspect, the present invention provides a method for killing one or more dust mites and/or denaturing or deactivating one or more allergens in a textile, the method comprising contacting the textile with a formulation as defined in the first or second aspects.

In an embodiment, the methods of the third and fourth aspects include the step of adding the formulation to a laundry cycle containing the textile with one or more dust mites and/or allergens. In an embodiment, the formulation is added to a laundry cycle conducted in cold water. In another embodiment, the formulation is added to a laundry cycle containing laundry detergent. In another embodiments, the method includes the step of rinsing the textiles with the formulation. In other embodiments, the method includes the step of rinsing the textiles with the formulation, wherein the formulation is diluted.

In another embodiment, the method includes the step of contacting the textile with a formulation as defined in the first or second aspects, wherein the emulsion is diluted.

In other embodiments, the method further includes the step of rinsing the textile to remove the one or more mites and/or allergens that have been denatured or deactivated.

In some embodiments, the method includes the step of soaking the textile with an anti-allergen and/or anti-dust mite laundry formulation in the form of an oil-in-water emulsion as defined in the first or second aspects for a time sufficient to kill one or more dust mites and/or denature or deactivate one or more allergens present in the textile.

According to a fifth aspect, the present invention provides the use of a formulation as defined in the first or second aspects for killing one or more dust mites and/or denaturing or deactivating one or more allergens present in a textile.

According to a sixth aspect, the present invention provides a process for preparing an anti-dust mite laundry formulation in the form of an oil-in-water emulsion, the process comprising the steps of:

i) preparing an oil phase by suspending or solubilising benzyl benzoate in one or more emulsifiers;
ii) preparing a water phase by dissolving one or more preservatives, an emulsion stabiliser and a pH modifying agent in water; and
iii) combining the oil phase and the water phase with mixing.

According to a seventh aspect, the present invention provides a process for preparing an anti-dust mite and/or anti-allergen laundry formulation in the form of an oil-in-water emulsion, the process comprising the steps of:

i) preparing an oil phase by suspending or solubilising benzyl benzoate in one or more emulsifiers;

ii) preparing a water phase by dissolving one or more allergen denaturants, one or more preservatives, an emulsion stabiliser and a pH modifying agent in water; and iii) combining the oil phase and the water phase with mixing.

In some embodiments of the sixth and seventh aspects, the mixing is performed under high shear.

In other embodiments of the sixth and seventh aspects, the mixing is performed at room temperature.

In other embodiments of the sixth and seventh aspects, oil phase is added to the water phase.

According to an eighth aspect, the present invention provides an anti-dust mite laundry formulation in the form of an oil-in-water emulsion produced by a process as defined in the sixth aspect.

According to a ninth aspect, the present invention provides an anti-dust mite and/or anti-allergen laundry formulation in the form of an oil-in-water emulsion produced by a process as defined in the seventh aspect.

DETAILED DESCRIPTION

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The term "about" or "approximately" as used herein means within an acceptable error range for the particular value as determined by one of ordinary skill in the art, which will depend in part on how the value is measured or determined, i.e., the limitations of the measurement system.

Unless defined otherwise, all technical and scientific terms used herein have the same meaning as commonly understood by those of ordinary skill in the art to which the invention belongs. For the purposes of the present invention, the following terms are defined below.

As used herein, the term "emulsion" refers to a mixture of two or more phases, such that each phase is liquid and one phase is dispersed in another phase, resulting in a mixture that is homogenous. The emulsions described herein may comprise of an oil phase and a water phase. In some embodiments, the oil phase is dispersed in the water phase, or vice versa. However in a preferred embodiment, the emulsions described herein comprise an oil phase dispersed in a water phase. The emulsion may be prepared by any means, however low energy means are preferred as such methods are more efficient. Such means may include heating of the phases prior to mixing, mixing under high shear and the like. Other means that achieve emulsification are also envisaged.

As used herein, the term "oil-in-water emulsion" refers to an emulsion where the oil phase of the emulsion is dispersed in the water phase of the emulsion. The term "oil phase" refers to a non-aqueous phase, which typically contains components that are only slightly soluble or are insoluble in water. The oil phase may comprise one or more non-water solvents or carriers, typically a solvent or carrier that can solubilise components that show little aqueous solubility. The term "water phase" refers to an aqueous phase, which may contain components that are dissolved therein, for example, components that generally display greater aqueous solubility than non-aqueous solubility.

As used herein, the term "laundry" refers to the cleaning of one or more textiles. Preferably, the textiles are household textiles, for example, clothing, linen, bedding, towels, and the like.

As used herein, the term "mite" refers to one or many small or microscopic parasitic arachnids of subclass Acari. Typically, the mite is a dust mite or house dust mite. The terms "dust mite" and "house dust mite" are used interchangeably herein. The dust mite may be of any species, including, for example, *Dermatophagoides pteronyssinus* (European house dust mite), *D. farinae* (American house dust mite), *D. evansi, D. microceras, D. halterophilus, D. siboney, D. neotropicalis, D. alexfaini, D. anisopoda, D. chirovi, D. deanei, D. rwandae, D. scheremeteroskyi, D. scheremetewskyi, D. simplex, Euroglyphus maynei* (Mayne's house dust mite), *E. longior, Hirstia domicola, Malayoglyphus carmelitus, M. intermedius, Pyroglyphus africanus, Sturnophagoides brasiliensis*, or *Biomia tropicalis*.

As used herein, the term "allergen" refers to a substance that triggers an allergic reaction in a subject when present in the vicinity of the subject. An allergic reaction is an immune response in a subject, where the response is mediated by events such as the release of histamine from immune cells and inflammatory responses. Examples of allergens include dust mites, other mites, animal products (such as animal fur, saliva, dander, dust mite droppings, eggs, larvae and the like) from animals and other insects, pollen from flowers and/or other plants, weeds, grasses, trees or parts thereof, and mould. In household settings, common allergens include dust mites, cat and dog fur, pollen, grasses and the like. Examples of other allergens include fungal allergens, where the spores of the fungus induce an allergic response. Sources of allergens from fungi include mushrooms and the like. A subject that is allergic to a specific allergen may develop an allergic response when exposed to or when in the vicinity of the specific allergen. Examples of allergic responses include sneezing, wheezing, swelling and/or inflammation of the airways, watery eyes, asthma, eczema or atopic dermatitis, urticaria or hives. In an embodiment, the allergen comprises a dust mite or dust mite excretion. In another embodiment, the allergen is from a household pet, for example fur, hair or dander from a mammalian household pet such as a cat or dog. In other embodiments, the allergen may comprise, for example, pollen or mould.

As used herein, the term "anti-allergen" refers to a substance that reduces or ameliorates the allergic reaction in a subject that is sensitive to and/or has developed an allergic reaction in response to an allergen. An anti-allergen substance may work by denaturing protein allergens, such that they are unable to trigger an allergic response in the subject.

As used herein, the term "anti-dust mite" refers to a substance that reduces or eradicates one or more dust mites. In turn, an anti-dust mite agent may reduce or ameliorate the allergic reaction in a subject that is sensitive to and/or has developed an allergic reaction to a mite, specifically a dust mite.

As used herein, the term "miticide" refers to a substance that can reduce or eradicate one or more mites when administered to said mites.

The formulations having anti-dust mite properties described herein comprise benzyl benzoate in an amount sufficient to provide an acaricidal and/or miticidal effect when the emulsion is added to a laundry cycle. In some embodiments, benzyl benzoate is present in an amount of between about 10% w/w and about 25% w/w. In other embodiments, benzyl benzoate is present in an amount of between about 15% w/w and about 25% w/w. In an embodiment, benzyl benzoate is present in an amount of about 10% w/w, about 11% w/w, about 12% w/w, about 13% w/w, about 14% w/w, about 15% w/w, about 16% w/w, about 17% w/w, about 18% w/w, about 19% w/w, about 20% w/w, about 21% w/w, about 22% w/w, about 23% w/w, about 24% w/w or about 25% w.w. In another embodiment, benzyl benzoate is present in an amount of about 15% w/w. In another embodiment, benzyl benzoate is present in an amount of about 17% w/w. In another embodiment, benzyl benzoate is present in an amount of about 20% w/w. In some embodiments, the benzyl benzoate is present in a formulation provided in the form of an oil-in-water emulsion.

As used herein, the term "emulsifier" refers to a substance that stabilises an emulsion by reducing the surface tension between one or more liquids in a mixture. Emulsifiers may be ionic or non-ionic, however non-ionic emulsifiers may be preferred in some instances. Ionic emulsifiers may be anionic or cationic emulsifiers. Emulsifiers may be added to mixtures of liquids that are immiscible and form separate phases in the absence of the emulsifier. The addition of an emulsifier to such a mixture results in the formation of the emulsion. Other terms in the art may be used interchangeably with the term "emulsifier". Examples of other terms include surfactant, surface active agent, wetting agent, detergent, emulgent, foaming agent, dispersant and the like, where each of these (and any not listed here) are used to refer to an agent that stabilises an emulsion. Classes of emulsifiers include those based on amines, sorbitans, sorbitols, glycols, gylcerols, sucroses, glucosides, fatty alcohols and the like. Other emulsifiers may be based on fatty acids, such as castor oils, and modified forms thereof. The emulsifiers may be esterified one or more times with a suitable fatty acid or the like, for example, a long chain fatty acid, with the number of ester groups dependent on the nature of the fatty acids and the number of positions that may be esterified. Some long chain fatty acids include fatty acids having between 8 and 30 carbon atoms and may be saturated or unsaturated. In some embodiments, the long chain fatty acids have between 10 and 30 carbon atoms, 12 to 30 carbon atoms, 12 to 25 carbon atoms, 15 to 25 carbon atoms, 16 to 22 carbon atoms, 18 to 22 carbon atoms or 18 to 20 carbon atoms. Unsaturated fatty acids contain one or more carbon-carbon double bonds. Examples of fatty acids that may provide an ester group as part of an emulsifier of the present invention include caprylic acid, capric acid, lauric acid, myristic acid, palmitic acid, stearic acid, arachidic acid, behenic acid, lignoceric acid, cerotic acid and oleic acid. The fatty acids may form an ester with glycerols, sorbitans, sorbitols and the like. Examples of such emulsifiers include the "Span" emulsifiers (based on sorbitan). The emulsifiers may also be ethoxylated one or more times, for example. Emulsifiers may also be derivatised, for example, by installation of one or more ethylene glycol groups to provide a polyethylene glycol (i.e. ethoxylate) derivative. Examples of such emulsifiers include the "Tween" emulsifiers (based on sorbitan), ethoxylated fatty alcohols and ethoxylated castor oils. In some embodiments, the emulsifier has between 1 and 10 moles of ethoxylation. In other embodiments, the emulsifier has between 2 and 9 moles of ethoxylation. In other embodiments, the emulsifier has between 3 and 8 moles of ethoxylation.

The choice of emulsifiers and the amounts in which they are present in the oil-in-water emulsion can contribute to the stability of the overall emulsion and maintaining the solubility and suspension of the benzyl benzoate and other components of the emulsion. The one or more emulsifiers may be selected on the basis of their hydrophilic-lipophilic balance (HLB) values, for example, the use of emulsifiers having different HLB values in a particular ratio may be used to approximate the HLB of the component that has limited solubility. In some embodiments of the present invention, the emulsifiers are selected to provide an HLB that approximates the HLB of benzyl benzoate in order to improve the emulsification of benzyl benzoate. In some embodiments, the emulsions of the present invention comprise a single emulsifier. In other embodiments, the emulsions comprise more than one different emulsifiers. In some embodiments, the emulsifier is a sorbitol-based emulsifier. In another embodiment, the emulsifier is an esterified sorbitol-based emulsifier. The emulsifier may be esterified by one or more groups, for example, with a fatty acid or the like. In another embodiment, the emulsifier is an ethoxylated sorbitol-based emulsifier. The emulsifier may comprise one or more ethoxyl groups, i.e. the emulsifier may be polyethoxylated.

In an embodiment, one or more emulsifiers of the present formulations contain one or more long chain fatty acids. In an embodiment, one or more emulsifiers of the present formulations contain one or more ethylene glycol groups, which may also be referred to as ethylene oxide groups or oxyethylene groups. In other embodiments, one or more emulsifiers of the present formulations contain one or more ethylene glycol groups in an amount of between about 1 and about 200 mol ethylene oxide.

In an embodiment, one or more emulsifiers of the present formulations are based on sorbitan. In an embodiment, the sorbitan-based emulsifier is esterified. In a further embodiment, the sorbitan-based emulsifier is esterified with one or more fatty acids. In an embodiment, the sorbitan-based emulsifier is esterified with one or more $C_8$ to $C_{30}$ long chain fatty acids. In another embodiment, the long chain fatty acid is a $C_{10}$ to $C_{30}$ fatty acid. In another embodiment, the long chain fatty acid is a $C_{10}$ to $C_{20}$ fatty acid. In some embodiments, the sorbitan-based emulsifier contains one, two or three long chain fatty acid ester groups. In an embodiment, the sorbitan-based emulsifier contains one long chain fatty acid ester group. In another embodiment, the sorbitan-based emulsifier contains two long chain fatty acid ester groups. In other embodiments, the sorbitan-based emulsifier contains three long chain fatty acid ester groups. In some embodiments, the sorbitan-based emulsifier containing long chain fatty acid ester groups also contains one or more ethylene glycol groups. In some embodiments, the sorbitan-based emulsifier contains ethylene glycol groups in an amount of between about 3 to about 40 moles of ethylene glycol for each sorbitan group. In other embodiments, the sorbitan-based emulsifier contains between about 5 to about 30 moles of ethylene glycol for each sorbitan group. In a further embodiment, the sorbitan-based emulsifier contains between about 15 to about 25 moles of ethylene glycol for each sorbitan group. In an embodiment, the sorbitan-based emulsifier contains one, two or three long chain fatty acid ester groups and between about 15 to about 15 moles of ethylene glycol for each sorbitan group in the emulsifier. In an embodiment, the sorbitan-based emulsifier contains three long chain fatty acid ester groups, wherein the ester groups are derived from oleic acid. In a specific embodiment, the sorbitan-based emulsifier is a sorbitan trioleate. In a further embodiment, the sorbitan-based emulsifier is a sorbitan trioleate further comprising between about 15 to about 25 moles of ethylene glycol.

In an embodiment, one or more emulsifiers of the present formulations are based on a castor oil, containing predominantly triglycerides, specifically ricinoleic acid and fatty acid esters thereof. In a further embodiment, the emulsifier is a hydrogenated castor oil. In a further embodiment, the emulsifier is a castor oil blend. In yet another embodiment, the emulsifier is a castor oil that comprises one or more ethylene glycol groups. In another embodiment, the emulsifier is a castor oil that is both hydrogenated and comprises multiple polyethylene glycol groups. In a further embodiment, the emulsifier is a castor oil containing between about 1 to 200 moles of ethylene glycol for each castor oil group. In an embodiment, the emulsifier is a castor oil blend comprising multiple polyethylene glycol groups. In an embodiment, the emulsifier contains between about 10 moles to about 100 moles, about 10 moles to about 50 moles, about 20 moles to about 50 moles, about 30 moles to about 50 moles or about 40 moles of polyethylene glycol. In a further embodiment, the emulsifier is polyethylene glycol 40 hydrogenated castor oil.

In an embodiment, one or more emulsifiers are an ethoxylated fatty alcohol. In some embodiments, the fatty alcohol contains between 6 and 30 carbon atoms, between 8 and 24 carbon atoms, between 8 and 20 carbon atoms or between 8 and 16 carbon atoms. In other embodiments, the fatty alcohol contains 8, 10, 12, 14 or 16 carbon atoms. In some embodiments, the emulsifier is an ethoxylated fatty alcohol containing between about 3 to about 25 moles of ethoxylation. In some embodiments, the emulsifier is an ethoxylated fatty alcohol containing between about 3 moles to about 20 moles, about 3 moles to about 15, about 3 moles to about 10 moles or about 3 moles to about 8 moles of ethoxylation. In an embodiment, the emulsifier is an ethoxylated fatty alcohol containing between 8 and 16 carbon atoms and between about 3 to about 10 moles of ethoxylation, In another embodiment, the emulsifier is an ethoxylated fatty alcohol containing about 12 carbon atoms and between about 3 to about 8 moles of ethoxylation.

In an embodiment, the emulsions described herein comprise one or more emulsifiers in an amount of between about 1% w/w and about 5% w/w. In some embodiments, the emulsions comprise one or more emulsifiers in an amount of about 1% w/w, about 2% w/w, about 3% w/w, about 4% w/w or about 5% w/w.

In some embodiments, the emulsions described herein comprise more than one emulsifier. In some embodiments, the emulsions described herein comprise more than one emulsifier, where each is present in the emulsion in the same or different amounts. In some embodiments, the emulsions described herein comprise more than one emulsifier in different amounts, where the emulsifiers are present in the emulsion in a ratio of between about 1:1 to about 1:10, for example, about 1:1, about 1:2, about 1:3, about 1:4, about 1:5, about 1:6, about 1:7, about 1:8, about 1:9 or about 1:10. The amount and ratio of the emulsifiers present may depend on several factors, including the exact nature of each emulsifier, the amount of benzyl benzoate in the emulsions and the other components in the emulsions.

As used herein, the term "textile" refers to a fabric material created by weaving, knitting, bonding, interlacing or braiding a series of yarns or threads together. The threads or yarns of a textile may be the same or different and may originate from animal sources (for example, the hair, fur or skin of an animal), a plant source (for example, grass, straw, bamboo, cotton, rayon, modal and hemp) or a synthetic source (for example, a polyester, acrylic, nylon, spandex, lurex, aramid or carbon fibre). A textile may then be used to create items such as clothing, towels, linen, household furnishings, coverings and the like.

As used herein, the terms "denaturing" and "deactivating" in relation to an allergen refer to a process whereby the activity of an allergen is ameliorated, thereby reducing the effect of the allergen and any related allergic reaction. An allergen may be denatured chemically, i.e. by exposure to a chemical compound. Alternatively, subjecting the allergen to conditions such as heat, high pH or low pH may also denature or deactivate the allergen.

The formulations described herein may comprise one or more allergen denaturants. Since most allergens are protein in nature, denaturing the protein allergen will generally lead to a reduction in the allergic reaction effected by the allergen. While it is known that sufficient heat (i.e. elevated temperatures) will denature proteins, the use of heat alone may be insufficient to denature all allergens and reduce the allergenic effect. Also, high temperatures may be unsuitable for some textiles. Without wishing to be bound by theory, the applicant believes that the use of a chemical allergen denaturant (instead of modifying either the temperature or pH to which the textile is exposed), provides for a more efficient denaturing of the allergens.

In some embodiments, the formulations comprising one or more allergen denaturants are provided in the form of an oil-in-water emulsion. In an embodiment, the formulation comprises one or more allergen denaturants in a total amount of between about 0.1% w/w and about 5% w/w. In an embodiment, the formulation comprises one or more allergen denaturants in a total of about 0.1% w/w, about 0.2% w/w about 0.5% w/w, about 0.8% w/w, about 1% w/w, about 2% w/w, about 3% w/w, about 4% w/w or about 5% w/w.

In some embodiments, the formulations described herein comprise more than one allergen denaturant, where each is present in the formulation in the same or different amounts. In some embodiments, the formulations described herein comprise more than one allergen denaturant in different amounts, where the allergen denaturants are present in the formulations in a ratio of between about 1:1 to about 1:10, for example, about 1:1, about 1:2, about 1:3, about 1:4, about 1:5, about 1:6, about 1:7, about 1:8, about 1:9 or about 1:10.

In some embodiments, the formulations disclosed herein comprise a component that is capable of denaturing a protein allergen. In some embodiments, the formulations comprise urea as an allergen denaturant. In some embodiments, the formulations comprise urea as an allergen denaturant in an amount of between about 0.1% w/w and about 5% w/w. In some embodiments, the formulations comprise urea in an amount of about 0.1% w/w. In other embodiments, the formulations comprise urea in an amount of about 0.5% w/w. In some embodiments, the formulation comprises urea in an amount of about 1% w/w. In another embodiment, the formulation comprises urea in an amount of about 2% w/w. In a further embodiment, the formulation comprises urea in an amount of about 3% w/w. In another embodiment, the formulation comprises urea in an amount of about 4% w/w. In yet another embodiment, the formulation comprises urea in an amount of about 5% w/w.

As discussed above, high pH or low pH environments can also denature allergen proteins, however such environments are likely to damage textiles. The formulations as defined herein may comprise components that inherently modify the pH of the emulsion in which they are dissolved or suspended. The use of a particular component in the formulation may serve more than one purpose. For example, some formulations defined herein comprise triethanolamine as an allergen denaturant. Since triethanolamine contains a basic nitrogen group, the compound is therefore capable of acting as a base and can effect an increase in the pH of the emulsion. Since triethanolamine is a weak base, the pH of the formulation is increased, however the extreme pH conditions that would be detrimental to textiles are avoided. Without wishing to be bound by theory, the applicant believes that the use of a component such as triethanolamine may serve as an allergen denaturant by chemically denaturing proteins and providing a slight increase in pH that is also known to denature allergens.

In an embodiment, the formulations described herein comprise triethanolamine as a pH modifying agent. In another embodiment, the formulation comprises triethanolamine in an amount of between about 0.1% w/w and about 5% w/w. In an embodiment, the formulation comprises triethanolamine in an amount of about 0.1% w/w. In another embodiment, the formulation comprises triethanolamine in an amount of about 0.5% w/w. In an embodiment, the formulation comprises triethanolamine in an amount of about 1% w/w. In another embodiment, the formulation comprises triethanolamine in an amount of about 2% w/w. In a further embodiment, the formulation comprises triethanolamine in an amount of about 3% w/w. In another embodiment, the formulation comprises triethanolamine in an amount of about 4% w/w. In yet another embodiment, the formulation comprises triethanolamine in an amount of about 5% w/w.

In some embodiments, the formulations described herein comprise a pH modifying agent that lowers the pH of the formulation. In some embodiments, the pH modifying agent that lowers the pH of the formulation is an acid. For example, the formulations comprising an acid may result in an emulsion having a pH of less than about 7. In some embodiments, the acid is a weak acid. In other embodiments, the acid is a strong acid. In some embodiments, the acid is an organic acid. In other embodiments, the acid is an inorganic acid. Without wishing to be bound by theory, the applicant believes that the use of an appropriate acid to provide a formulation that has a pH of less than about 7 results in a stable emulsion comprising benzyl benzoate, specifically an emulsion that comprises benzyl benzoate in the concentrations as disclosed herein. In exemplary embodiments the acid is lactic acid. In some embodiments, upon inclusion of the pH modifying agent the resulting formulation has a pH of between about 4.0 and about 7.0, between about 4.0 and about 6.0, between about 4.0 and about 5.5, or between about 4.0 and about 5.0. In some embodiments, the formulation has a pH of less than about 6.5, less than about 6, less than about 5.5, less than about 5, or less than about 4.5. In some embodiments, the formulation has a pH of about 5.5, about 5, about 4.5 or about 4.

In some embodiments, the formulations disclosed herein comprise an acid in an amount of between about 0.1% w/w to about 5% w/w. In an embodiment, the formulation comprises an acid in an amount of about 0.1% w/w. In an embodiment, the formulation comprises an acid in an amount of about 0.2% w/w. In an embodiment, the formulation comprises an acid in an amount of about 0.3% w/w. In an embodiment, the formulation comprises an acid in an amount of about 0.4% w/w. In an embodiment, the formulation comprises an acid in an amount of about 0.5% w/w. In an embodiment, the formulation comprises an acid in an amount of about 1% w/w. In an embodiment, the formulation comprises an acid in an amount of about 2% w/w. In an embodiment, the formulation comprises an acid in an amount of about 3% w/w. In an embodiment, the formulation comprises an acid in an amount of about 4% w/w. In an embodiment, the formulation comprises an acid in an amount of about 5% w/w. In some embodiments, the formulations disclosed herein comprise a weak acid. In some embodiments, the weak acid is lactic acid. In certain embodiments, the formulation comprises lactic acid in an amount of between about 0.1% w/w to about 5% w/w. In other embodiments, the formulations comprise lactic acid in an amount of between about 0.1% w/w to about 0.5% w/w, between about 0.1% w/w to about 0.4% w/w, between about 0.1% w/w to about 0.3% w/w or between about 0.1% to about 0.2% w/w. In other embodiments, the formulation comprises lactic acid in an amount of about 0.1% w/w, about 0.2% w/w, about 0.3% w/w, about 0.4% w/w or about 0.5% w/w.

The formulations described herein may also contain one or more preservatives. The use of a preservative in the formulations described herein may be used to provide additional storage stability of the formulations, such that the formulations remain stable for a sufficient time. Where the formulation is provided as an emulsion, the use of one or more preservatives may also contribute to the stability of the emulsion, either directly or indirectly. For example, the formulations may comprise one or more preservatives to prevent any bacterial or fungal growth in the formulations, which results in a formulation which is not suitable for the intended use. The use of a preservative may therefore be used to prevent degradation of the components in the formulation and/or the growth of unwanted bacteria and fungi. In some embodiments, the formulations described herein comprise one or more preservatives. In one embodiment, the formulations described herein comprise one preservative. In other embodiments, the formulations described herein comprise more than one preservative. In some embodiments, the formulations comprise one or more preservatives present in an amount between about 0.1% w/w to about 5% w/w. In an embodiment, the formulations comprise one or more preservatives present in an amount between about 1% w/w to about 5% w/w. In other embodiments, the formulations comprise one or more preservatives in an amount between about 2% w/w to about 5% w/w. In other embodiments, the formulations comprise one or more preservatives in an amount between about 2% w/w to about 4% w/w. In certain embodiments, the formulations comprise one or more preservatives selected from the group consisting of phenoxyethanol, benzyl alcohol, sodium benzoate, potassium sorbate, benzisothiazolinone, methylisothiazolinone and iodopropynyl butyl carbamate.

In an embodiment, the formulations described herein comprise phenoxyethanol as a preservative. In some embodiments, phenoxyethanol is present in an amount between about 0.5% w/w to about 1.5% w/w. In some embodiments, phenoxyethanol is present in an amount of about 0.5% w/w, about 0.75% w/w, about 1% w/w, about 1.25% w/w or about 1.5% w/w.

In another embodiment, the formulations described herein comprise benzisothiazole as a preservative. In some embodiments, benzisothiazole is present in an amount between about 0.1% and about 1% w/w. In some embodiments, benzisothiazole is present in an amount of about 0.1% w/w, about 0.25% w/w, about 0.5% w/w, about 0.75% w/w or about 1% w/w.

In some embodiments, the formulations described herein comprise both phenoxyethanol and one or more further preservatives. In some embodiments, the formulations comprise phenoxyethanol and one or more further preservatives present in a ratio of between about 1:1 to about 10:1. In some embodiments, phenoxyethanol and the further preservatives are present in a formulation in a ratio of about 1:1, about 2:1, about 3:1, about 4:1, about 5:1, about 6:1, about 7:1, about 8:1, about 9:1 or about 10:1. In some embodiments, the amount of phenoxyethanol and the further preservatives together in the formulation is between about 0.5% w/w and about 2.5% w/w. In certain embodiments, the amount of phenoxyethanol and the further preservatives together in the formulation is about 1% w/w, about 1.25% w/w, about 1.5% w/w, about 1.75% w/w, about 2.0% w/w, about 2.25% w/w, about 2.5% w/w, about 2.75% w/w, about 3% w/w, about 3.25% w/w, about 3.5% w/w, about 3.75% w/w, about 4% w/w, about 4.25% w/w, about 4.5% w/w, about 4.75% w/w or about 5% w/w. In some embodiments, the formulations comprise one further preservative. In some embodiments, the further preservative is benzisothiazolinone. In other embodiments, the further preservative is methylisothiazolinone. In another embodiment, the further preservative is iodopropynyl butyl carbamate. In other embodiments, the formulations comprise more than one further preservative. In some embodiments, the formulations comprise two further preservatives. In other embodiments, the formulations comprise three, four or five further preservatives. In some embodiments, the formulations comprise phenoxyethanol and sodium benzoate as preservatives. In other embodiments, the formulations comprise phenoxyethanol and potassium sorbate as preservatives. In other embodiments, the formulations comprise phenoxyethanol and benzyl alcohol as preservatives. In some embodiments, the formulations comprise phenoxyethanol, sodium benzoate and potassium sorbate as preservatives. In other embodiments, the formulations comprise phenoxyethanol, sodium benzoate and benzyl alcohol as preservatives. In other embodiments, the formulations comprise phenoxyethanol, potassium sorbate and benzyl alcohol as preservatives. In other embodiments, the formulations comprise phenoxyethanol, potassium sorbate and benzyl alcohol as preservatives. In yet another embodiment, the formulations comprise phenoxyethanol, sodium benzoate, potassium sorbate and benzyl alcohol as preservatives.

In certain embodiments, the formulations described herein comprise sodium benzoate as a preservative. In some embodiments, sodium benzoate is present in an amount between about 0.1% w/w to about 1% w/w. In some embodiments, sodium benzoate is present in an amount of about 0.1% w/w, about 0.2% w/w, about 0.3% w/w, about 0.4% w/w, about 0.5% w/w, about 0.6% w/w, about 0.7% w/w, about 0.8% w/w, about 0.9% w/w or about 1% w/w.

In certain embodiments, the formulations described herein comprise potassium sorbate as a preservative. In some embodiments, potassium sorbate is present in an amount between about 0.1% w/w to about 1% w/w. In some embodiments, potassium sorbate is present in an amount of about 0.1% w/w, about 0.2% w/w, about 0.3% w/w, about 0.4% w/w, about 0.5% w/w, about 0.6% w/w, about 0.7% w/w, about 0.8% w/w, about 0.9% w/w or about 1% w/w.

In certain embodiments, the formulations described herein comprise benzyl alcohol as a preservative. In some embodiments, benzyl alcohol is present in an amount between about 0.1% w/w to 1% w/w. In some embodiments, sodium benzoate is present in an amount of about 0.1% w/w, about 0.2% w/w, about 0.3% w/w, about 0.4% w/w, about 0.5% w/w, about 0.6% w/w, about 0.7% w/w, about 0.8% w/w, about 0.9% w/w or about 1% w/w.

In one exemplary embodiment, a formulation of the present invention comprises benzyl benzoate, sorbitan trioleate, ethoxylated castor oil blend, phenoxyethanol, xanthan gum, urea, triethanolamine, benzisothiazole and water. In another exemplary embodiment, a formulation of the present invention comprises benzyl benzoate, sorbitan trioleate, ethoxylated castor oil blend, phenoxyethanol, xanthan gum, triethanolamine and water.

In another exemplary embodiment, a formulation of the present invention comprises benzyl benzoate, sorbitan trioleate, ethoxylated castor oil blend, phenoxyethanol, xanthan gum, urea, triethanolamine and water. In another exemplary embodiment, a formulation of the present invention comprises benzyl benzoate, sorbitan trioleate, ethoxylated castor oil blend, phenoxyethanol, xanthan gum and water.

In another exemplary embodiment, a formulation of the present invention comprises benzyl benzoate, sorbitan monooleate, ethoxylated castor oil blend, phenoxyethanol, xanthan gum, lactic acid, sodium benzoate, potassium sorbate and water. In another exemplary embodiment, a formulation of the present invention comprises benzyl benzoate, sorbitan monooleate, ethoxylated castor oil blend, phenoxyethanol, xanthan gum, lactic acid, sodium benzoate, potassium sorbate, benzyl alcohol and water. In some of the exemplary embodiments, the sorbitan monooleate is ethoxylated. In some of the exemplary embodiments, the sorbitan monooleate is polyethoxylated.

The formulations described herein are intended for use as a laundry formulation under standard conditions and are themselves aqueous. The disclosure of the formulations herein describe the non-water components of the formulations and their relative amounts, where the remainder of the formulation is taken to be water.

The formulations described herein may also condition other components, such as additional solvents, other actives, and the like. Additional solvents may be selected for the physical properties they may impart to the formulation overall, such as maintaining the emulsion, improving solubility of one or more components, modifying the physical properties of the formulation overall (for example, the specific gravity, viscosity, etc) or the like. The formulations may comprise other components that are used to modify the visual appearance of the final product, but do not affect the use or activity of the formulation.

As used herein, the term "effective amount" refers to an amount sufficient to effect beneficial results. The effective amount of a given component may depend on the nature of the component and the result to be achieved.

According to certain aspects, the present invention provides methods for killing dust mites and/or denaturing or deactivating allergens in a textile by contacting the textile with a formulation as defined herein. The method may include adding a formulation of the present invention to the textile as part of a domestic laundry cycle, where the laundry cycle is performed in cold or warm water. In some embodiments, the laundry cycle is performed in cold water. The method may include contacting a textile with a formulation as defined herein, wherein the formulation is diluted in water. In some embodiments, the method includes the step of soaking and/or rinsing the textiles with a formulation as described herein. The methods for killing dust mites and/or deactivating or denaturing allergens in a textile may include the further step of removing the mites and/or allergens by rinsing the textile after contact with a formulation as defined herein.

The formulations described herein are intended to be used by consumers in a domestic setting, i.e. that the emulsion is simply added to a laundry cycle in a standard domestic washing machine. The formulations may be provided as a concentrate, where the water in the laundry cycle is sufficient to provide dilution of the concentrate such that the intended dose of the benzyl benzoate and/or the allergen denaturants is achieved. The intended dose of benzyl benzoate as provided by the formulations disclosed herein ranges from about 50 g per 25 L of water to about 100 g per 25 L of water. In an embodiment, the dose of benzyl benzoate provided by the formulations disclosed herein is about 75 g per 25 L of water.

In particular embodiments of the present invention, the formulations described herein maintain the anti-dust mite and/or anti-allergen activity in the presence or absence of a laundry detergent. Thus embodiments of the present invention contemplate the addition of formulations described herein to a laundry cycle with a laundry detergent. Alternatively, the formulations may be added to the laundry cycle after the laundry detergent has been added to and is already in contact with the textiles. Alternatively, the formulations may be used in a laundry cycle to kill dust mites and/or denature or inactivate allergens without use of a laundry detergent in the same laundry cycle. The formulations described herein may be used in a laundry cycle with a water temperature of, for example, between about 15° C. to about 50° C., meaning that the laundry cycle may be a cold water cycle or a warm water cycle. By way of ex ample only, the laundry cycle may utilise a water temperature of about 15° C., about 20° C., about 25° C., about 30° C., about 35° C., about 40° C., about 45° C., or about 50° C.

The formulations described herein may be employed as laundry additives as an adjunct to other anti-dust mite and anti-allergen prevention, elimination and management strategies, including, for example, regular washing of bedding, the use of anti-dust mite and anti-allergen bed covers (such as mattress covers, quilt covers, pillow covers), maintaining a low humidity environment, the use of antihistamines, regular vacuuming and the use of air filters.

The formulations disclosed herein may be prepared by standard means known in the art. For example, where the formulation is provided in the form of an oil-in-water emulsion, the emulsion may be achieved by mixing an oil phase and a water phase, where each phase comprises certain components of the overall emulsion. In some embodiments, the emulsion is formed by mixing an oil phase and a water phase under high shear. In some embodiments, the emulsion is formed by mixing an oil phase and a water phase at room temperature. In some embodiments, the oil phase is added to the water phase with mixing, wherein the mixing may be performed under high shear.

In some embodiments, the oil phase comprises benzyl benzoate and one or more emulsifiers. The oil phase may be produced by combining benzyl benzoate with the one or more emulsifiers. In some embodiments, the benzyl benzoate may be added gradually to the one or more emulsifiers with mixing. In some embodiments, the oil phase may be produced by adding benzyl benzoate gradually to the one or more emulsifiers with mixing under high shear. In other embodiments, the oil phase may be produced by combining more than one emulsifier to produce a homogeneous oil phase, followed by addition of benzyl benzoate and further mixing.

In some embodiments, the water phase comprises one or more preservatives, an emulsion stabiliser and a pH modifying agent. In certain embodiments, the water phase comprises more than one preservative. The water phase may be produced by combining the one or more preservatives, emulsion stabiliser and pH modifying agent with water and mixing until a homogenous solution is obtained. The components of the water phase may be added sequentially or together with mixing during and/or after addition of the components.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Those skilled in the art will appreciate that the invention described herein in susceptible to variations and modifications other than those specifically described. It is to be understood that the invention includes all such variations and modifications which fall within the spirit and scope. The invention also includes all of the steps, features, compositions and compounds referred to or indicated in this specification, individually or collectively, and any and all combinations of any two or more of said steps or features.

EXAMPLES

The following examples are illustrative of the disclosure and should not be construed as limiting in any way the general nature of the disclosure of the description throughout this specification.

Example 1—Exemplary Formulations

Exemplary anti-dust mite laundry formulations (1807C, 2110C and 2110D) and exemplary anti-dust mite and anti-allergen laundry formulations (1807B, 1807D and 1807F) are provided in Tables 1 and 2. All components are listed as % w/w.

TABLE 1

Exemplary laundry formulations

| | 1807F % w/w | 1807B % w/w | 1807C % w/w | 1807D % w/w |
|---|---|---|---|---|
| Benzyl benzoate | 17 | 17 | 17 | 17 |
| POE 20 sorbitan trioleate | 2.4 | 2.4 | 2.4 | 2.4 |
| Ethoxylated castor oil blend | 0.4 | 0.4 | 0.4 | 0.4 |
| Phenoxyethanol | 1 | 1 | 1 | 1 |
| Xanthan gum | 0.3 | 0.3 | 0.3 | 0.3 |
| Urea | 2 | — | — | 2 |
| Triethanolamine | 2 | 2 | — | 2 |
| Benzisothiazole | 0.25 | — | — | — |
| Water | 74.65 | 76.9 | 78.9 | 74.9 |

TABLE 2

Exemplary laundry formulations

| | 2110C % w/w | 2110D % w/w | 2110F % w/w |
|---|---|---|---|
| Benzyl benzoate | 17 | 17 | 17 |
| POE 20 sorbitan monooleate | 2.4 | 2.4 | 2.4 |
| Ethoxylated castor oil blend | 0.6 | 0.6 | 0.6 |
| Phenoxyethanol | 1 | 1 | 1 |
| Xanthan gum | 0.5 | 0.5 | 0.5 |
| Lactic acid | 0.35 | 0.35 | 0.5 |
| Sodium benzoate | 0.5 | 0.5 | 0.5 |
| Potassium sorbate | 0.2 | 0.2 | 0.2 |
| Benzyl alcohol | — | 0.5 | 0.5 |
| Water | 77.45 | 76.85 | 76.8 |

Exemplary formulations 2110C, 2110D and 2110F have a pH between 4.5 and 5.0.

Stability testing demonstrated that Formulation 2110F retained the appearance of a white homogenous fluid emulsion, with a constant pH and constant viscosity, over a 12 week period when stored at either 4° C., 25° C. or 40° C.

Preparation of Emulsions

The formulations of the present invention may be oil-in-water emulsions that can be produced by combining one or more oil phases with one or more water phases. The formulations comprising benzyl benzoate are oil-in-water emulsions, with the benzyl benzoate incorporated as part of the oil phase given its low aqueous solubility. The oil and water phases of the oil-in-water emulsion are mixed under conditions and for a time wherein a homogeneous emulsion is produced and the phase boundary between the oil and water phases is not distinguishable.

The conditions under which the components of the formulations disclosed herein may vary according to the nature of the components and the overall emulsion. For example, the components may be combined at room temperature. Depending on the nature and the physical properties of the components in the formulation, the order and the manner in which they are combined may vary. Accordingly, the preparations disclosed herein are to ensure that the components remain dissolved or in solution or suspension to provide the formulations now disclosed.

A procedure for preparing an exemplary emulsion is as follows:

i) disperse xanthan gum in phenoxyethanol;
ii) prepare water phase comprising triethanolamine, urea and one or more preservatives by dissolving each component in water;
iii) add xanthan gum/phenoxyethanol mixture in the water phase;
iv) prepare oil phase comprising benzyl benzoate and one or more emulsifiers;
v) combine the xanthan gum/phenoxyethanol/water phase with the oil phase using a homogeniser.

Example 2—Activity Against Dust Mite Allergens

Samples of dust mite dust in sealed containers were provided for analysis. Prior to testing of the laundry formulations 1807B, 1807C and 1807D listed in Table 1 above, allergens were extracted from the dust mite dust for comparison. The effectiveness of formulations 1807B, 1807C and 1807D (see Example 1) was tested as described below.

Preparation of dust mite dust samples for testing was in accordance with procedures described in Tovey, E. R. et al., *Journal of Allergy and Clinical Immunology*, (2001), 108, 3, 369.

Laundry formulations for testing were stored at −20° C. until testing. Formulations were inverted three times before preparing extraction solutions of 50 mL with a solution of phosphate-buffered saline with 0.1% Tween-20 (PBS-T). PBS-T contains 135 mM NaCl, 2.7 mM KCl, 10 mM $Na_2HPO_4$, 1.8 mM $KH_2PO_4$, and 0.1% (v/v) Tween-20.

Approximately 50 mg of dust mite dust was weighed out into 15 mL falcon tubes and diluted in the respective formulation to a concentration between 5.0-5.3 mg/mL. Samples were extracted for 5 minutes at room temperature with end-over-end rotation. Extracts were centrifuged at 2000 g for 15 minutes.

500 L of the extract supernatants were diluted in a ratio of 1:1 with PBS-T and frozen at −20° C. until required. Samples were filtered through 0.22 M PES syringe filters prior to analysis.

ELISA assays for *Dermatophagoides* spp. Group 1 allergen (Der P1) were performed using kits pre-purchased from Indoor Biotechnologies (Cat #EPC-DP-1, Lot #44383) in accordance with the manufacturer's instructions without any deviations. All samples were analysed on an ELISA plate and samples were assayed on a robotic liquid handling workstation epMotion 5075 (Eppendorf). The plate was washed on Bio-Plex Pro II magnetic plate washer (Bio-Rad) and read with the FluoStar Optima reader. The assay plate was incubated at 25° C. in the absence of light and without shaking. Samples were diluted prior to analysis and analysed in triplicate, with the results shown in Table 3. Shown in Table 3 is a comparison of allergen extraction of MilliQ water, a buffer solution containing nonionic surfactant (PBS-T), test formulations 1807B, 1807C and 1807D alone and test formulation 1807D in addition with a laundry detergent. Test formulations 1807B and 1807D showed a significant difference in allergen removal when tested using the above protocol compared to water alone. (Formulation 1807C did not contain any of the added allergen removal ingredients). PBS-T is a buffer solution with surfactant used to measure indicative baseline allergen level in the sample. The addition of laundry detergent to sample 1807D increased the allergen removal.

TABLE 3

Formulations tested for Der P1, with results in triplicate, average values (and coefficient of variation, % CV) and statistical analysis provided.

| Formulation | Concentration of tested formulations | Der P1 concentration (ng/mL) #1 | #2 | #3 | Avg. Der P1 concentration (ng/mL) (% CV) | Relative Der P1 concentration (μg/g) | Paired t-test values |
|---|---|---|---|---|---|---|---|
| MilliQ Water | NA | 17.99 | 20.07 | 19.48 | 19.18 (5.57) | 3.73 | |
| PBS-T | 1 x | 27.70 | 26.71 | 26.93 | 27.12 (1.92) | 5.29 | |
| 1807B | 2.5 g/L | 22.55 | 27.71 | 25.78 | 25.34 (10.30) | 4.89 | 0.0204 |
| 1807C | 2.5 g/L | 23.60 | 20.02 | 23.56 | 22.40 (9.17) | 4.44 | 0.1970 |
| 1807D | 2.5 g/L | 21.06 | 22.33 | 22.73 | 22.04 (3.96) | 4.54 | 0.0400 |
| 1807D + Fab[a] | 2.5 g/L, 2.2 g/L | 29.56 | 29.24 | 28.27 | 29.02 (2.31) | 5.51 | 0.0077 |

[a]Fab Liquid Natural Elements detergent

Example 3—Efficacy Against House Dust Mites

A laboratory study was conducted to determine the efficacy of formulation 2110F (see Table 2) against house dust mite *Dermatophagoides pteronyssinus*. The ability of formulation 2110F to kill dust mites alone or in combination with common household laundry detergents was evaluated. Seven treatment groups were established as shown in Table 4.

TABLE 4

| Treatment groups | | | |
|---|---|---|---|
| Group | Treatment | Dilution | Replicates |
| 1 | 2110F alone | 2.8 g/L | 5 |
| 2 | 2110F + Cold Power Advance Clean (liquid) | 2.8 g/L (2110F) + 2.0 g/L (Cold Power) | 5 |
| 3 | 2110F + Biozet Clean Action (powder) | 2.8 g/L (2110F) + 1.8 g/L (Biozet) | 5 |
| 4 | 2110F + Dynamo 7 in 1 (liquid) | 2.8 g/L (2110F) + 2.0 g/L (Dynamo) | 5 |
| 5 | 2110F + Omo Active (liquid) | 2.8 g/L (2110F) + 2.2 g/L (Omo) | 5 |
| 6 | 2110F + Biozet Clean Action (liquid) | 2.8 g/L (2110F) + 2.2 g/L (Biozet) | 5 |
| 7 | water (negative control) | | 5 |

Dust mites were collected from homes in the inner west and southern suburbs of Sydney, and colonies maintained in an incubator prior to testing. For allocation into each treatment group approximately 15 dust mites were separated from the breeding medium using a fine paint brush under a Zeiss M3 stereomicroscope, and placed into a small dish with 3 ml of the treatment liquid. Dust mites were gently stirred to facilitate contact with the liquid and left for 25 minutes. After 25 minutes the liquid and dust mites were poured through a sieve of black cotton fabric, separating the dust mites from the treatment liquid. 10 dust mites were placed in a small plastic stoppered tube (2.5 cm×1 cm). The dust mites were place in an incubator and maintained at 25° C. and 75% relative humidity for 24 hours. After 24 hours, the number of live dust mites were counted. This was based on the ability of the dust mites to move in a coordinated manner.

Differences between treatment means in the number of dead dust mites were assessed for significance using analyses of variance (ANOVA) (SPSS Version 26, 2019). In addition, data were checked for compliance with the assumption of normal distribution and variance homogeneity using the PP plot and Levene's test for equality of error variances. If the assumption of the equality of variance was met, Ryan's Q-test was used, and if it was not met, Dunnett's T-3 test was used. Results are shown in Table 5. All treatment groups including 2110F were statistically superior to the negative control in killing dust mites.

TABLE 5

| Dust mite mortality | | |
|---|---|---|
| Group | Mean 24-hr mortality (+/−SE) | Percent mortality |
| 1 | 9.6 (0.25) | 96 |
| 2 | 9.2 (0.37) | 92 |
| 3 | 9.8 (0.2) | 98 |
| 4 | 9.4 (0.25) | 94 |
| 5 | 9.2 (0.37) | 92 |

TABLE 5-continued

| Dust mite mortality | | |
|---|---|---|
| Group | Mean 24-hr mortality (+/−SE) | Percent mortality |
| 6 | 9.4 (0.25) | 94 |
| 7 | 0.8 (0.37) | 8 |

The invention claimed is:

1. An anti-dust mite laundry formulation in the form of an oil-in-water emulsion, wherein the emulsion comprises:

an oil phase comprising benzyl benzoate and one or more emulsifiers;

a water phase comprising a preservative, an emulsion stabilizer dissolved or homogeneously dispersed in the water phase, and a pH modifying agent, wherein the water phase is a single liquid phase.

2. The laundry formulation according to claim 1, further comprising one or more allergen denaturants that allow for denaturation or deactivation of one or more protein allergens.

3. An anti-dust mite and anti-allergen laundry formulation in the form of an oil-in-water emulsion, wherein the emulsion comprises:

an oil phase comprising benzyl benzoate and one or more emulsifiers; and a water phase comprising one or more allergen denaturants, an emulsion stabilizer dissolved or homogeneously dispersed in the water phase, a pH modifying agent, and a preservative, wherein the water phase is a single liquid phase.

4. The laundry formulation according to claim 2, wherein the one or more allergen denaturants are present in an amount of between about 0.1% w/w to about 5% w/w.

5. The laundry formulation according to claim 2, wherein the one or more allergen denaturants comprises urea or triethanolamine.

6. The laundry formulation according to claim 5, wherein urea and/or triethanolamine is present in an amount of between about 0.1% w/w to about 10% w/w.

7. The laundry formulation according to claim 1, wherein the benzyl benzoate is present in an amount of between about 10% w/w and about 25% w/w.

8. The laundry formulation according to claim 1, wherein the one or more emulsifiers are selected from the group consisting of sorbitan esters, ethoxylated castor oils, and ethoxylated fatty alcohols.

9. The laundry formulation according to claim 8, wherein the one or more emulsifiers are present in an amount of between about 1% w/w to about 10% w/w.

10. The laundry formulation according to claim 1, wherein the emulsion stabilizer is present in an amount of about 0.1% w/w to about 1% w/w.

11. The laundry formulation according to claim 1, wherein the pH modifying agent increases the pH of the emulsion.

12. The laundry formulation according to claim 11, wherein the pH modifying agent is present in an amount of between about 0.1% w/w to about 5% w/w.

13. The laundry formulation according to claim 1, wherein the pH modifying agent decreases the pH of the emulsion.

14. The laundry formulation according to claim 13, wherein the pH modifying agent is present in an amount of between about 0.1% w/w to about 5% w/w.

15. The laundry formulation according to claim 13, wherein a final pH of the formulation is between about 4.5 and about 5.5.

16. The laundry formulation according to claim 1, wherein the preservative is present in an amount of between about 0.1% w/w to about 5% w/w.

17. A method for killing one or more dust mites or denaturing or deactivating one or more allergens in a textile, the method comprising contacting the textile with a formulation as defined in claim 1.

18. The method according to claim 17, wherein the laundry formulation is added to a laundry cycle comprising the textile with one or more dust mites or allergens.

19. The method according to claim 18, wherein the formulation is added to the laundry cycle, and further comprising a laundry detergent.

20. The method according to claim 17, wherein the method comprises the step of soaking the textile with the laundry formulation for a time sufficient to kill one or more dust mites or denature or deactivate one or more allergens present in the textile.

21. The laundry formulation according to claim 1, wherein the emulsion stabilizer is xanthan gum.

* * * * *